United States Patent
Zisimopoulos et al.

(10) Patent No.: US 9,088,936 B2
(45) Date of Patent: Jul. 21, 2015

(54) RETRIEVAL OF USER EQUIPMENT CAPABILITIES BY APPLICATION SERVER

(75) Inventors: Haris Zisimopoulos, London (GB); Ricky Kaura, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 13/818,025

(22) PCT Filed: Aug. 19, 2011

(86) PCT No.: PCT/KR2011/006151
§ 371 (c)(1), (2), (4) Date: Feb. 20, 2013

(87) PCT Pub. No.: WO2012/023836
PCT Pub. Date: Feb. 23, 2012

(65) Prior Publication Data
US 2013/0150052 A1    Jun. 13, 2013

(30) Foreign Application Priority Data
Aug. 20, 2010 (GB) .................................. 1014032.5

(51) Int. Cl.
*H04W 36/00* (2009.01)
*H04W 40/00* (2009.01)
(Continued)

(52) U.S. Cl.
CPC .............. *H04W 48/18* (2013.01); *H04W 36/14* (2013.01); *H04W 76/02* (2013.01)

(58) Field of Classification Search
CPC ........... H04M 3/00; H04M 1/00; H04W 4/00; H04W 36/00; H04W 40/00; H04W 72/00; H04W 48/18; H04W 36/14; H04W 76/02; H04W 24/00

USPC ...................... 455/418–420, 422.1, 423–425, 455/432.1–432.3, 433–434, 435.2, 455/436–445, 447–451, 452.1–452.2, 453, 455/524–525, 550.1, 552.2, 556.2, 455/560–561, 435.3, 466, 512, 517, 552.1, 455/557; 370/328–329, 331–333, 338, 341, 370/351–356, 395.5, 395.52, 913; 709/203, 709/227, 228–229, 237, 244

See application file for complete search history.

(56) References Cited

U.S. PATENT DOCUMENTS 8,964,961 B2 * 2/2015 Keller et al. ............. 379/265.05
8,971,875 B2 * 3/2015 Vedrine et al. ............. 455/432.1
(Continued)

FOREIGN PATENT DOCUMENTS

EP    1435748 A1    7/2004
WO   2009/091295 A1    7/2009

OTHER PUBLICATIONS

Falconetti et al. "Distributed Uplink Macro Diversity for Cooperating Base Stations," IEEE International Conference on Communications Workshops, Jun. 14-18, 2009, pp. 1-5.
(Continued)

*Primary Examiner* — Meless Zewdu
(74) *Attorney, Agent, or Firm* — Jefferson IP Law, LLP

(57) ABSTRACT

The present invention provides a method of establishing a call to or from a user equipment in a wireless communication system comprising a first wireless network and a second wireless network, the second wireless network having an association with the first wireless network, the wireless communication system having a serving node and an application server capable of communication with said serving node, and the method comprising: receiving a message from said serving node at the application server, said message having information regarding network capabilities of said user equipment; and determining at the application server whether to anchor said call in the first wireless network or the second wireless network dependent on said information regarding network capabilities of said user equipment.

29 Claims, 4 Drawing Sheets

(51) Int. Cl.
    *H04W 4/00* (2009.01)
    *H04W 48/18* (2009.01)
    *H04W 36/14* (2009.01)
    *H04W 76/02* (2009.01)

(56) References Cited

U.S. PATENT DOCUMENTS

| | | | |
|---|---|---|---|
| 2004/0218605 A1 | 11/2004 | Gustafsson et al. | |
| 2007/0209061 A1* | 9/2007 | Dekeyzer et al. | 726/3 |
| 2009/0262733 A1* | 10/2009 | Olson | 370/389 |
| 2010/0040020 A1* | 2/2010 | Chen | 370/331 |
| 2010/0087186 A1* | 4/2010 | Gupta et al. | 455/424 |
| 2010/0177691 A1* | 7/2010 | Patil et al. | 370/328 |
| 2010/0290448 A1 | 11/2010 | Rune | |
| 2011/0019650 A1* | 1/2011 | van Niekerk | 370/338 |
| 2013/0128865 A1* | 5/2013 | Wu et al. | 370/331 |

OTHER PUBLICATIONS

Teyeb, O. et al. "Handover Framework for Relay Enhanced LTE Networks," IEEE International Conference on Communications Workshops, Jun. 14-18, 2009, pp. 1-5.

* cited by examiner

US 9,088,936 B2

RETRIEVAL OF USER EQUIPMENT CAPABILITIES BY APPLICATION SERVER

TECHNICAL FIELD

The present invention relates generally to wireless communication systems, and more specifically, to a method and apparatus for retrieving information regarding network capabilities of a user equipment by an applications server.

BACKGROUND

Wireless communications systems comprising wireless networks, in which a user equipment (UE) such as a mobile handset communicates via wireless links to a network of base stations or other wireless access points connected to a telecommunications network, have undergone rapid development through a number of generations of radio access technology. The initial deployment of systems using analogue modulation has been superseded by second generation (2G) digital systems such as GSM (Global System for Mobile communications), typically using GERA (GSM Enhanced Data rates for GSM Evolution Radio Access) radio access technology, and these systems have themselves been replaced by or augmented by third generation (3G) digital systems such as UMTS (Universal Mobile Telecommunications System), using the UTRA (Universal Terrestrial Radio Access) radio access technology. Third generation standards provide for a greater throughput of data than is provided by second generation systems; this trend is continued with the proposals by the Third Generation Partnership Project (3GPP) of the Long Term Evolution (LTE) system, using E-UTRA (Evolved UTRA) radio access technology, which offers potentially greater capacity and additional features compared with the previous standards.

Note that the term "GERA" is used herein to refer to the radio access technology associated with GERAN (GERA networks) wireless networks, "UTRA" is used to refer to the radio access technology associated with UTRAN (UTRA networks) wireless networks, and similarly the term "E-UTRA" or "LTE" is used to refer to the radio access technology associated with E-UTRAN (E-UTRA networks) wireless networks.

LTE is designed primarily as a high speed packet switched network, and voice services, packet switched voice services and in particular Voice over Internet Protocol Multimedia Subsystem (VoIMS) services are envisaged, whereas previous generation systems such as UMTS support voice services that are primarily circuit switched.

As new technology is introduced, networks are typically deployed which include radio access networks that use a radio access technology according to a recent standard and also legacy radio access networks that use a legacy radio access technology. A user equipment may be typically capable of communication using two or more radio access technologies, so for example the user equipment is able operate using one radio access technology, perhaps offering high capacity, where this is available, but being able to operate using a legacy radio access technology, in those service areas of the network that do not support the other radio access technology, or that do not support preferred features.

There are a variety of handover procedures that have been developed to allow handover of a user equipment between a E-UTRA network and a UTRA/GERA network. In particular, handover procedures have been developed to allow handover when a voice call is in progress, that is to say so-called Voice Call Continuity (VCC) handover procedures. Typically a VCC procedure will be implemented under the control of a session transfer controller, which will typically comprise a Service Centralisation and Continuity Application Server (SCC AS) and a Serving Call Session Control Function and/or Interrogating Call Session Control function (I/S-CSCF). The session transfer controller is typically implemented in the Internet Protocol Multimedia Subsystem (IMS).

The IMS is typically used to control packet switched services offered over the E-UTRA network; control of circuit switched services in a UTRA/GERA network typically involves a mobility controller, such as a Mobility Switching Centre (MSC). The session transfer controller typically communicates with the mobility controller during handover according to a VCC procedure.

A user equipment may be equipped with a single radio transceiver, for reasons of economy or for minimising power consumption, so that simultaneous communication with two radio access networks is not possible. In this case the handover protocol typically uses a break-before-make radio connection during handover. Handover procedures known as Single Radio Voice Call Continuity (SR VCC) procedures may be available for use in some user equipments.

DISCLOSURE OF INVENTION

Technical Problem

A call may typically be anchored, so that if an access connection to or from a user equipment is changed during a call, the remainder of the routing of the call beyond an anchor point is unchanged. When handing over from a wireless network offering packet switched services to a wireless network offering circuit switched services, it may be necessary to change the call from being anchored in the packet switched wireless network to being anchored in the circuit switched network, but this may involve an undesirable delay. It may be possible to anchor all calls in the circuit switched network at the establishment of the calls, but this may be wastefully of resources of the circuit switched network.

Other types of application server, for use in wireless communications systems, such as a Machine-Type Communications Server, may also suffer from inefficient performance of applications due to the need to cater for user equipments of differing capabilities.

Aspects of the invention address disadvantages of prior art systems.

Solution to Problem

In accordance with a first aspect of the present invention, there is provided a method of establishing a call to or from a user equipment in a wireless communication system comprising a first wireless network and a second wireless network, the second wireless network having an association with the first wireless network, the wireless communication system having a serving node and an application server capable of communication with said serving node, and the method comprising:

receiving a message from said serving node at the application server, said message having information regarding network capabilities of said user equipment; and determining at the application server whether to anchor said call in the first wireless network or the second wireless network dependent on said information regarding network capabilities of said user equipment.

An advantage of determining whether to anchor the call in the first wireless network or the second wireless network dependent on network capabilities of said user equipment is that a change in anchoring during the call, and its associated delay, may be avoided by selecting an appropriate network to anchor the call on establishment of the call, taking into account the possibility or otherwise of a change in anchoring during a call, which may be dependent on the network capabilities of said user equipment.

In an embodiment of the invention, the first wireless network is capable of supporting packet switched voice communication and the second wireless network is capable of supporting circuit switched voice communication.

It is particularly advantageous to avoid a change in anchoring of a call between a network supporting packet switched voice communication and a network supporting circuit switched voice communication, since this may involve introducing an unacceptable delay. The possibility of a change in anchoring of a call between a network supporting packet switched voice communication and a network supporting circuit switched voice communication may depend on the network capabilities of the user equipment.

In an embodiment of the invention, said message relates to whether or not said user equipment has a single radio interface for communicating with the first wireless network and the second wireless network, such that only one radio connection with a wireless network can exist at any given point in time.

In an embodiment of the invention, said message relates to an ability of said user equipment to perform Single Radio Voice Call Continuity (SRVCC) procedures.

It is particularly advantageous to determine a network in which to anchor the call on the basis of the capability of the user equipment to perform SRVCC procedures, since the capability is an indicator of the possibility that a change in anchoring of a call between a network supporting packet switched voice communication and a network supporting circuit switched voice communication may take place during the call.

In an embodiment of the invention, the method comprises anchoring said call in the second wireless network dependent at least on said message indicating that said user equipment has the ability to perform Single Radio Voice Call Continuity (SRVCC) procedures.

In an embodiment of the invention, said serving node is in the first wireless network, and said serving node may be a Mobility Management Entity (MME).

Alternatively, in an embodiment of the invention, said serving node may be in the second wireless network and may be a Serving GPRS Support Node (SGSN) or may be a Mobile Switching Centre (MSC).

In an embodiment of the invention, the application server comprises a Service Centralisation and Continuity Application Server (SCC AS).

In an embodiment of the invention, the method further comprises:

sending a request message from the application server to said serving node requesting network capabilities of said user equipment.

This has an advantage of prompting said serving node to send the message having information regarding network capabilities of said user equipment.

In an embodiment of the invention, the method comprises:

determining at the application server whether to anchor said call in the first wireless network or the second wireless network in further dependence on an indication of an access network over which said call is originated or terminated.

This may be advantageous, since the possibility that a change in anchoring of a call between a network supporting switched voice communication and a network supporting circuit switched voice communication may depend on a type of access network over which said call is originated or terminated, in addition to the capabilities of the user equipment. For example, a SRVCC handover may not be possible to a WiFi network.

In accordance with a second aspect of the invention there is provided an application server for use in assisting establishment of a call to or from a user equipment in a wireless communication system comprising a first wireless network and a second wireless network, the second wireless network having an association with the first wireless network, the wireless communication system having a serving node capable of communication with the application server, and the application server being arranged to:

receive a message from said serving node, said message having information regarding network capabilities of said user equipment; and determine whether to anchor said call in the first wireless network or the second wireless network dependent on said information regarding network capabilities of said user equipment.

In accordance with a third aspect of the invention there is provided a method of adapting performance of an application at an application server according to network capabilities of a user equipment in a wireless communication system, the wireless communication system having a serving node capable of communication with the application server, the method comprising:

sending a first message from the application server to said serving node requesting network capabilities of said user equipment;

receiving a second message from said serving node at the application server, said message conveying information regarding network capabilities of said user equipment; and adapting performance of said application at the application server on the basis of the second message.

This has an advantage that the performance of the application server may be optimised, since not all user equipments may have the same network capabilities, so that operations at the application server specific to certain network capabilities not appropriate to said user equipment may be avoided.

In an embodiment of the invention, the wireless communication system comprises a first wireless network and a second wireless network, the second wireless network has an association with the first wireless network and the application server has an association with the first wireless network.

In an embodiment of the invention, said serving node may be in the first wireless network, and may be a Mobility Management Entity (MME).

Alternatively, in an embodiment of the invention, said serving node may be in the second wireless network, and may be a Serving GPRS Support Node (SGSN) or may be a Mobile Switching Centre (MSC).

In an embodiment of the invention, the method comprises sending the first message and receiving the second message via a Home Subscriber Server (HSS). It may be convenient to use Diameter Sh-pull mechanism to implement the first and second messages.

In an embodiment of the invention, the application server comprises a Service Centralisation and Continuity Application Server (SCC AS).

Alternatively, in an embodiment of the invention, said application server is a Machine-Type Communications Server and the requested network capabilities of said user equipment relate to user equipment transport capabilities.

This has an advantage that operations of the application server applicable to specific transport capabilities of the equipment may be avoided if said user equipment does not have these capabilities.

In an embodiment of the invention, said application server is a Machine-Type Communications Server and the requested network capabilities of the user equipment relate to said user equipment being a low priority device.

This has an advantage that operations of the application server applicable to higher priority devices may be avoided if said user equipment is a low priority device.

In an embodiment of the invention, the requested network capabilities of said user equipment relate to I1 capability of said user equipment.

In accordance with a fourth aspect of the invention there is provided an application server arranged to adapt performance of an application according to network capabilities of a user equipment in a wireless communication system, the wireless communication system having a serving node capable of communication with the application server, the application server being arranged to:

send a first message to said serving node requesting network capabilities of the user equipment;

receive a second message from said serving node, said message conveying information regarding network capabilities of said user equipment; and adapt performance of the application on the basis of the second message.

Further features and advantages of the invention will be apparent form the following description of preferred embodiments of the invention, which are given by way of example only.

Advantageous Effects of Invention

According to the present invention, it is particularly advantageous to avoid a change in anchoring of a call between a network supporting packet switched voice communication and a network supporting circuit switched voice communication, since this may involve introducing an unacceptable delay.

DETAILED DESCRIPTION

Figure 1:
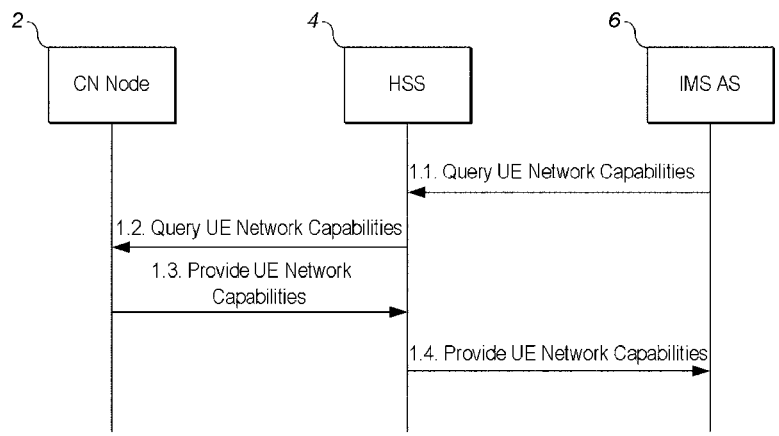
FIG. 1 is a schematic diagram showing signalling paths for querying of network capabilities of a user equipment by an IMS Application Server in an embodiment of the invention.

By way of example a first embodiment of the invention will now be described in the context of a wireless communications system including a wireless network, that may be a radio access network, supporting communication using E-UTRA/LTE radio access technology, as associated with E-UTRAN networks in LTE systems, supporting packet switched voice communication, and another wireless network supporting communication using GERA/UTRA radio access technology, as associated with GERAN/UTRAN networks in GSM/UMTS systems, supporting circuit switched voice communication. The wireless communication system has an application server, typically a Service Centralisation and Continuity Application Server Application Server (SCC AS) within the Internet Protocol Multimedia Subsystem (IMS) associated with the E-UTRAN network However, it will be understood that this is by way of example only and that other embodiments may involve wireless networks using other radio access technologies, such as IEEE802.16 WiMax systems; embodiments are not limited to the use of a particular radio access technology, nor are embodiments limited to situations involving more than one wireless network. Embodiments of the invention may relate to other types of application server, such as a Machine-Type Communications Server.

The first embodiment relates to the retrieval of network capabilities by an applications server from user equipment relating to the ability of the user equipment to carry out single radio voice call continuity (SRVCC) procedures. If a user equipment has this capability, the application server determines that a call should be anchored in the GERAN/UTRAN network, on establishment of the call. Signalling for the call is typically anchored within the Access Transfer Control Function (ATCF) and call data is typically anchored within the Access Transfer Gate Way (ATGW). Anchoring in the GERAN/UTRAN network, on establishment of the call avoids the delay involved in transferring the anchoring of the call once the call is established, in the eventuality that SRVCC procedures are activated. However, if the user equipment does not have a SRVCC capability, then the call is anchored in the E-UTRAN network, typically within the IMS, on establishment, so avoiding unnecessary use of GERAN/UTRAN resources. The user capability is typically retrieved from a serving node, so that it is typically not necessary to query the user equipment on establishment of the call, so that procedures involving communication with the user equipment are typically not affected.

The operation of the first embodiment may be illustrated by reference to the following deployment scenarios. Initial deployments of E-UTRAN networks are typically within areas of coverage of existing wireless networks, such as legacy GERAN/UTRAN networks. On initial deployment, a E-UTRAN network provides service to a smaller geographical area than that covered by existing legacy networks, covering for example city centres, and the areas covered may not be contiguous. Furthermore, only a subset of the available network features may be enabled, and the enablement of features may not be uniform across the network. In particular, due to its potentially enhanced data capacity in comparison with legacy systems, initial deployments of E-UTRAN may concentrate on providing high bandwidth data services, for example to LTE enabled equipment such as personal digital assistants (PDAs) or to user equipment in the form of plug in communication modules for laptop computers. For this reason, the primary LTE voice service, a packet switched service known a Voice over IMS (VoIMS), may not be available in certain areas.

If a user equipment moves out of an area of coverage of an E-UTRAN network, then a handover to a GERAN/UTRAN network may be required, and the handover may be a Single Radio Voice Call Continuity (SRVCC) handover. Not all user equipments have SRVCC capability.

An alternative procedure, that may be termed Dual Radio Voice Call Continuity (DRVCC), is a capability that is available to some user equipments having dual radios. By this procedure may be seen as a domain transfer that involves two calls, rather than a handover, since the user equipment itself establishes a call in each domain, that is to say in each wireless network. As such, there is no need for transfer of anchoring between networks as a result of a DRVCC procedure.

Some user equipment may have neither SRVCC nor DRVCC capability.

A typical network configuration for the first embodiment may be as follows. A user equipment may be connected to a first radio access network, being for example a E-UTRAN radio access network, and handover is required to a second radio access network, in this example a UTRAN/GERAN radio access network, so that the user equipment, on handover to the second radio access network, is connected to the UTRAN/GERAN radio access network. The first radio access network has a core network that may include a Mobile Management Entity (MME), which may be a serving node, and a Home Subscriber Server (HSS) which acts in support of handover within E-UTRAN. An Internet Protocol Multimedia subsystem (IMS) includes an application server, that is to say an IMS application server, typically a Service Centralisation and Continuity Application Server Application Server (SCC AS) 10, which is typically capable of communication with the second radio access network, and a Serving Call Session Control Function and/or Interrogating Call Session Control function (I/S-CSCF).

The second radio access network has a serving node, typically a Serving GPRS Support Node (SGSN), or a Mobile Switching Centre (MSC) or Mobile Switching Centre Server (MSC-S).

FIG. 1 is a schematic diagram showing signalling paths for querying of network capabilities of a user equipment by an IMS Application Server 6. At steps 1.1 and 1.2, a request message is sent from the application server, in this example the IMS application server 6, to a Core Network (CN) node 2, typically a serving node, requesting network capabilities of a user equipment. The request message may be sent via a Home Subscriber Server (HSS) 4. A message is sent at steps 1.3 and 1.4 from the Core Network node 2 and received at the IMS Application Server 6, having information regarding network capabilities of the user equipment; this message may also be sent via the Home Subscriber Server (HSS) 4. The message providing user equipment network capabilities may typically be sent in response to receipt of the request message.

On receipt of the message providing user equipment network capabilities, the application server typically determines whether to anchor the call in the first wireless network, i.e the E-UTRAN in this example, or in the second wireless network, in this example the UTRAN/GERAN.

Figure 2:
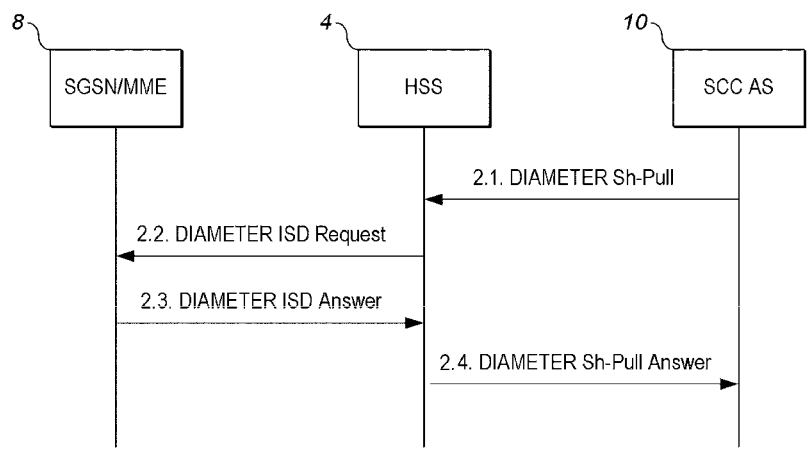
FIG. 2 is a schematic diagram showing signalling paths for querying of network capabilities of a user equipment by a Service Centralisation and Continuity Application Server (SCC AS) in an embodiment of the invention.

FIG. 2 shows a more specific example of the first embodiment, showing signalling paths for querying of network capabilities of a user equipment by a Service Centralisation and Continuity Application Server (SCC AS) 10. In this example, the serving mode 8 may be either a SGSN or MME. At step 2.1, a Diameter Sh-Pull message is sent to the HSS 4, and at step 2.2, the HSS 4 sends a Diameter Insert Subscriber Data (ISD) request to the SSGN or MME as appropriate, steps 2.1 and 2.2 being queries of user equipment network capabilities. At step 2.3, the serving node 8, that is to say the SGSN/MME as appropriate, sends a Diameter ISD Answer to the HSS 4, and at step 2.4 the HSS 4 sends a Diameter Sh-Pull Answer to the SCC AS 10. The messages at steps 2.3 and 2.4 provide user equipment network capabilities.

Figure 3:
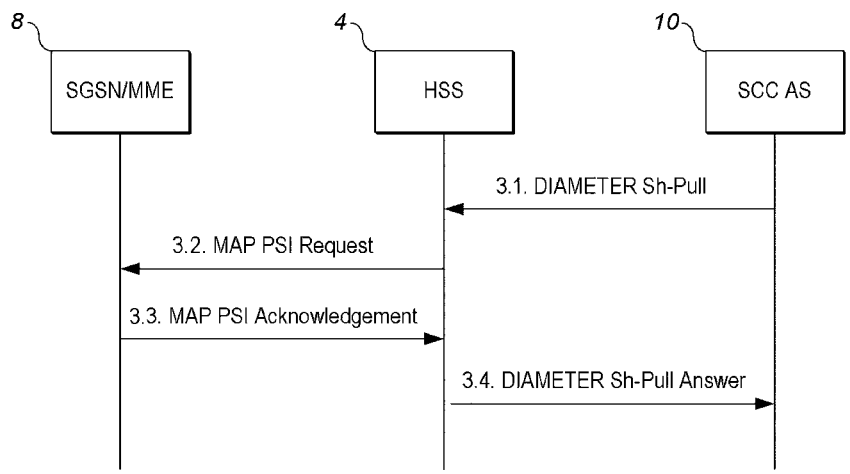
FIG. 3 is a schematic diagram showing alternative signalling paths for querying of network capabilities of a user equipment by a SCC AS in an embodiment of the invention.

FIG. 3 shows an alternative example of the first embodiment. Steps 3.1 and 3.4 proceed similarly to steps 2.1 and 2.4 already described, for communication between the HSS 4 and the SCC AS 10. However, for communication between the HSS 4 and SGSN/MME 8, at steps 3.2 and 3.3, a MAP procedure is used. At step 3.2 a MAP PSI request is sent to the SGSN/MME 8, querying UE network capabilities, and at step 3.3 a MAP PSI acknowledgement is sent by the SGSN/MME 8 providing user equipment network capabilities.

Figure 4:
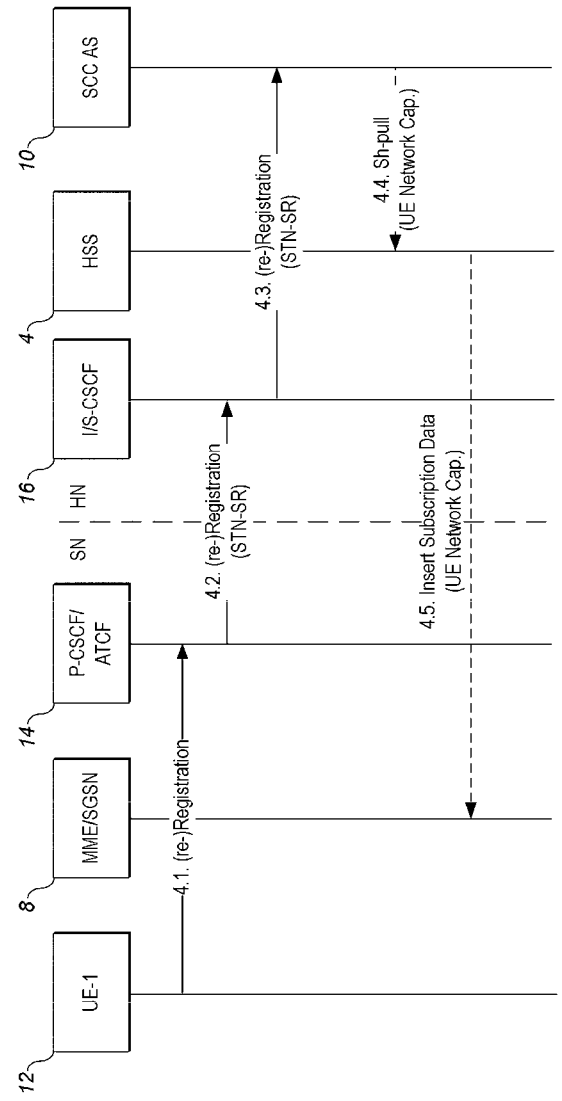
FIG. 4 is a schematic diagram showing signalling paths for requesting user equipment network capabilities during user equipment registration in an embodiment of the invention.

FIG. 4 is a schematic diagram showing signalling paths for requesting user equipment network capabilities during user equipment registration, triggering a request for user equipment capability information to be sent by the SCC AS 10. FIG. 4 shows an example of a conventional sequence of messages is shown at steps 4.1, 4.2, and 4.3, sent from a first user equipment 12, to a Proxy Call Session Control Function (P-CSCF) or Access Transfer Control Function (ATCF) 14, to a Interrogating/Serving Call Session Control Function (I/S-CSCF) 16 and thence to a SCC AS 10. In order to determine the user equipment network capabilities, for example regarding SRVCC capability, the SCC AS 10 sends a Sh-pull message at step 4.4 to the HSS 4, and the HSS sends an Insert Subscriber Data message (ISD request) to a serving node, in this example the MME/SGSN 8, to request the user equipment network capabilities.

Figure 5:
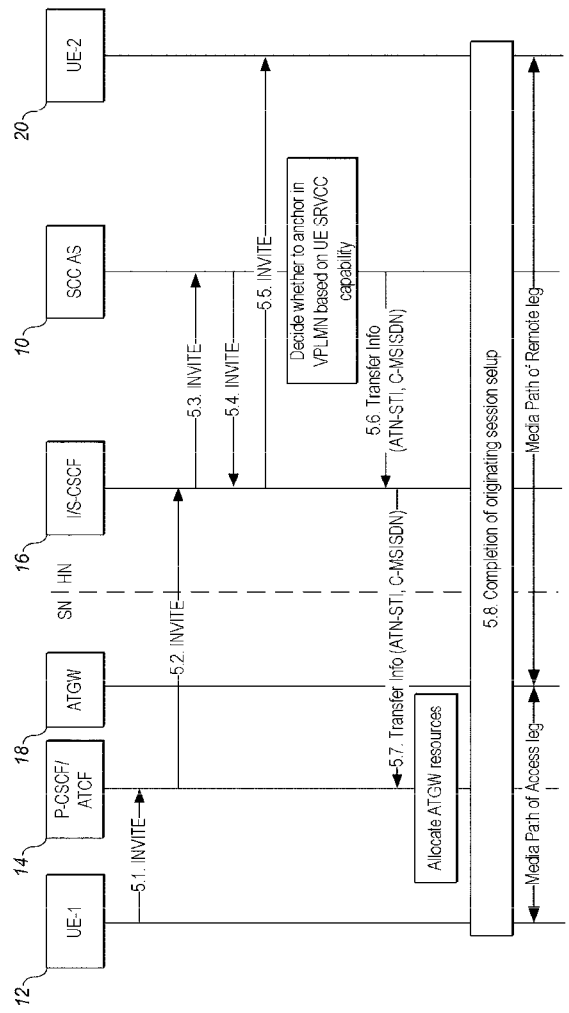
FIG. 5 is a schematic diagram showing signalling paths for a case in which a SCC AS determines that a mobile originated call should be anchored in the Visited Public Land mobile Network (VPLMN) in an embodiment of the invention.

FIG. 5 is a schematic diagram showing signalling paths for a case in which a SCC AS determines that a mobile originated call (originated by user equipment UE-1 12), should be anchored in the second wireless network, in this example a network having circuit switched capability, that may be referred to as the Visited Public Land Mobile Network (VPLMN), rather than the first wireless network, in this example a network having circuit switched capability, that may be referred to as the Home Public Land Mobile Network (HPLM).

It can be seen that the SCC AS decides whether to anchor in the VPLMN based on retrieving the user equipment network capabilities, which may be according to the procedures described in connection with FIGS. 1 to 4, and in this example decides to anchor in the VPLMN. In this example, the Access Transfer Gateway (ATGW) 18 is used to anchor the call data and the ATCF is used to anchor the call signalling. The ATGW and ATCF may in some cases be co-located with the Mobile Switching Centre (MSC). A call is established to a second user equipment UE-2 20.

Figure 6:
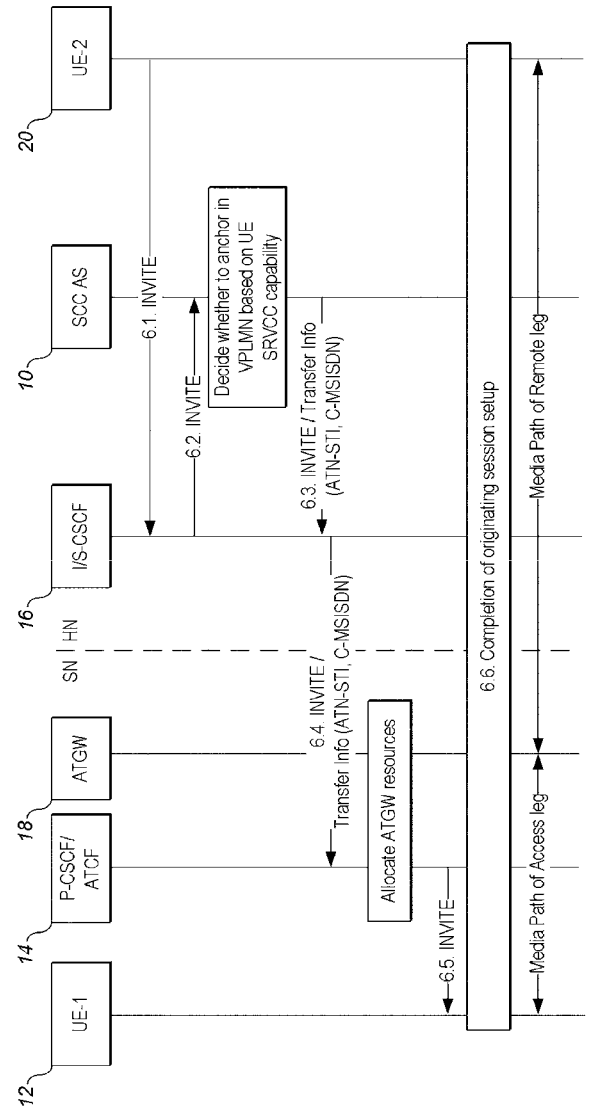
FIG. 6 is a schematic diagram showing signalling paths for a case in which a SCC AS determines that a mobile terminated call should be anchored in the Visited Public Land mobile Network (VPLMN) in an embodiment of the invention.

FIG. 6 shows an equivalent process for a mobile terminated call, terminated at UE-1 12. Similarly to the procedure for the mobile originated call shown in FIG. 5, the SCC AS decides whether to anchor in the VPLMN based on retrieving the user equipment network capabilities, decides to anchor in the VPLMN, and the ATGW 18 is used to anchor the call data and the ATCF is used to anchor the call signalling.

It should be noted that in the case that the SCC AS determines that the call should be anchored in the HPLMN, messages 5.6 and 5.7 may not be sent. The call remains anchored in the IMS; the IMS comprises at least the SCC AS 10 and the I/S-CSCF 16.

Some wireless networks, such as WiFi access networks, may not support SRVCC. Therefore, an application server may decide whether to anchor a call in dependence on an indication of an access network over which the call is originated or terminated.

In a second embodiment of the invention, the application server is a Machine-Type Communications (MTC) Server and the requested network capabilities of said user equipment relate to user equipment transport capabilities; operations of the application server applicable to specific transport capabilities of the equipment may be avoided if said user equipment does not have these capabilities. A MTC server may be used, for example, for smart metering. The user equipment may be installed devices for meter reading and sending data via a wireless network.

It can be seen from the embodiments described above that a generic mechanism is provided that would allow an application server to obtain user equipment capabilities on a basis of need.

In particular, embodiments may be applicable, but not limited to the following: enhanced SRVCC (eSRVCC) architecture in the context of SRVCC enhancements; provision of user equipment I1 capability in IMS for terminations; and MTC Server knowledge of user equipment network capabilities. In particular, retrieval of user equipment network capabilities in IMS application servers may be provided without requiring impact on the Session Initiation Protocol (SIP) in the user equipment.

In general, embodiments have the benefits that the user equipment is unmodified and that optimizations are achieved through modifications in the network procedures. The SCC AS may decide to anchor a certain voice-call in the VPLMN at the time of origination or termination in order to achieve a faster switching time when SRVCC handover is performed.

It should be noted that the network capability of a user equipment is not provided to the SCC AS by prior art SIP/IMS signalling mechanisms, and in particular information as to whether it supports SRVCC or not is not provided. Taking into account the possibility that same SCC AS may be used to anchor calls for both SRVCC and DRVCC user equipments, if the SCC AS were to blindly decide to anchor all calls (including signalling and media) in the VPLMN then it may unnecessarily waste resources in the VPLMN since it would also anchor calls from DRVCC user equipments that are not required to be anchored in the VPLMN.

It should be noted that application servers may benefit from knowledge of types of user equipment network capabilities other than SRVCC capability, for example I1 capability.

Embodiments of the invention may provide a mechanism that allows any IMS application server to retrieve user equipment network capabilities and make related decisions based on the capabilities of the user equipment. In this respect it allows the SCC AS to know (based on the user equipment capabilities) whether it is adequate, and would provide any benefit, to anchor the call in the VPLMN.

Embodiments of the invention may provide a mechanism that may be used by an application server to retrieve the user equipment network capability from the serving nodes, and in particular an embodiment of an application server (SCC AS) that decides to anchor a mobile originated (MO) and/or mobile terminated (MT) call based in an appropriate domain based on the capability of the user equipment.

Embodiments of the invention allow the application server to make informed decisions based on the user equipment Network Capabilities. In the case of eSRVCC architecture it allows the SCC AS to decide whether it needs to anchor the call in ATCF/ATGW based on whether the user equipment supports SRVCC, either during user equipment IMS registration or at the time a MO/MT call is received.

Embodiments may consist of a mechanism that would allow any application server to be able to request and receive user equipment network capabilities of a particular user equipment from its serving node for example SGSN/MME.

In order to keep compatibility with the existing interfaces of the different entities involved in the exchange and the overall mechanisms used in the 3GPP architecture to retrieve the user equipment network capabilities from the serving node, embodiments of the invention may use a Sh-Pull mechanism from the Application Server to the HSS and the Insert Subscriber Data from the HSS to the Serving Nodes.

Table 1 below shows a possible modification for the Sh data where a new IE may be added in order to indicate to the HSS the request to retrieve the user equipment network Capabilities from the Serving Nodes (i.e. MME/SGSN).

TABLE 1

| Data Ref. | XML tag | Defined in | Access key | Operations |
|---|---|---|---|---|
| 24 | UE Network Capabilities | Xxx | MSISDN + Data reference | Sh-Pull |

The HSS may use the existing Diameter Insert Subscriber Data Req. with modification to IDR Flags IE as shown in Table 2 below, where a new IDR flag may be introduced in order to indicate the request for UE/MS Network Capabilities or MAP messages.

TABLE 2

| Bit | Name | Description |
|---|---|---|
| 5 | UE Network Capabilities | This bit when set shall indicate that the request for MME or the SGSN the HSS requests the UEs Network Capabilities |

Note:
Bits not defined in this table shall be cleared by the sending HSS and discarded by the receiving MME.

The serving node (SGSN/MME) may answer the Insert Subscriber Data Req. using a modified ISD answer format, as shown below in Table 3, that may contain the user equipment Network Capabilities IE for this particular user equipment. Alternatively, MAP may be used.

TABLE 3

| Information element name | Mapping to Diameter AVP | Cat. | Description |
|---|---|---|---|
| UE-Network-Capabilities | UE-Network-Capabilities | C | Provides the UEs Network Capabilities information. It shall be present if the UE-Network Capabilities Information was requested within the IDR |

A new value in the "Feature-List" AVP may be used to indicate the supported features for user equipment network capabilities. A new feature-bit value may be assigned for user equipment capabilities. If MME or SGSN indicates in the ULR command that it does not support the retrieval of user equipment capability information via the IDR/IDA commands, the HSS may not set the "UE Network capabilities" bit in the IDR-Flags in subsequent IDR commands sent towards that MME or SGSN.

A possible implementation of a UE-Network-Capabilities AVP will now be described. The UE-Network-Capabilities AVP may be of type Grouped and it may contain information related to the current user equipment network capabilities stored on the serving network node.

The AVP format may be as follows:
UE-Network-Capabilities ::=<AVP Header: xxx, 10415>
1*{UE-Capability}
*[AVP]
The UE-Capability AVP may be as follows:
UE-Capability ::=<AVP Header: xxx, 10415>
{UE-Capability-Name}
{UE-Capability-Support}
*[AVP]
The UE-Capability-Name AVP may be of type Enumerated. Possible values for this type may include the following:
   0 SRVCC from UTRAN HSPA or E-UTRAN to GERAN/UTRAN
   1 I1 protocol
The UE-Capability-Support AVP may be of type Enumerated with the following values:
   Not Supported (0)
   This value indicates that the UE does not have support of this capability.
   Supported (1)
   This value indicates that the UE has support of this capability.

The Application Server that receives the user equipment network capabilities IE may filter out the information that is relevant for a given application. The Application Server (SCC AS) may read the SRVCC capability IE from the user equipment network capabilities that it receives from the serving nodes (via the HSS) and determine whether it needs to anchor a mobile originating or mobile terminating call in ATGW and ATCF as shown in FIG. 5 and FIG. 6. If user equipment network capabilities indicate that the user equipment does not support SRVCC then the SCC AS may decide not to anchor in ATGW and ATCF and in this way it will save resources that would be otherwise unnecessarily wasted.

The SRVCC capability IE may be as follows:
   0 SRVCC from UTRAN HSPA or E-UTRAN to GERAN/UTRAN not supported
   1 SRVCC from UTRAN HSPA or E-UTRAN to GERAN/UTRAN supported FIG. 2 shows an embodiment using Diameter on the interface between the HSS and the SGSN/MME (S6a/S6d). The Sh-Pull request may be an XML-document that uses an Access-Key (which includes a Data Reference). In the Sh-pull answer, an XML document may be returned of type "User-Data". Additionally, the UML model which describes the XML document may be modified to include the user equipment capabilities.

Protocol for the Diameter Sh-Pull/Sh-Pull-Answer between the HSS and SCC AS may requires changes to the conventional XML-profile sent between the HSS and SCC AS to include information related to the user equipment network capabilities.

FIG. 3 shows an embodiment using MAP on the interface between the HSS and the SGSN (Gr).

The MAP protocol relating to FIG. 3 may require changes to conventional protocol as follows:

1. The "SGSN-Capability" type that may be sent in the Update-GPRS-Location (UGL) to indicate the SGSN's capability to process a UE-Capability request. The HLR may not request this information from the SGSN when it received a Diameter-Sh pull if the UE-capability was not included. The UE-capability query support may be implemented in "SGSN-Capability" as a NULL type.

2. The "Requested-Info" type that may be used in the PSI request to request the UE-Capability from the SGSN.

3. The "Subscriber-Info" type that may be sent in the PSI-ack that may contain the results of the PSI query including the "UE capabilities".

4. The base type in the "Subscriber-Info" may point to a "constructed" MAP information element that may contain a list of supported UE network capabilities. To allow for the type to be extended, the type may be constructed with MAP ellipses notation.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for establishing a call to or from a user equipment (UE) by an application server in a wireless communication system, the method comprising:
   transmitting a first message to request a network capability of the UE to a serving node;
   in response to the transmitted first message, receiving a second message including information regarding the network capability of the UE from the serving node; and
   in response to the receipt of the second message, transmitting a third message including information regarding whether the UE has a capability of a single radio voice call continuity (SRVCC) to an access transfer control function (ATCF) based on the information regarding the network capability of the UE,
   wherein the information included in the third message is used for determining whether to anchor the call in an access transfer gateway (ATGW).

2. The method of claim 1, wherein the wireless communication includes a first wireless network and a second wireless network, and
   wherein the first wireless network is capable of supporting packet switched voice communication and the second wireless network is capable of supporting circuit switched voice communication.

3. The method of claim 1, wherein the second message relates to whether the UE has a single radio interface for communicating with a first wireless network and a second wireless network, such that only one of the first and the second radio connection can exist at any given point in time.

4. The method of claim 1, wherein the second message relates to an ability of the UE to perform SRVCC procedures.

5. The method of claim 4, wherein the information included in the third message indicates anchoring the call in the ATGW, if the second message indicates that the UE has the ability to perform the SRVCC procedures.

6. The method of claim 1, wherein the serving node is a mobility management entity (MME), if the serving node is in a packet switched wireless network.

7. The method of claim 1, wherein the first message is a Sh-pull message and the second message is a Sh-pull response message.

8. The method of claim 1, wherein the serving node is a serving GPRS support node (SGSN) or a mobile switching centre (MSC), if the serving node is in a circuit switched wireless network.

9. The method of claim 1, wherein the transmitting of the first message, the receiving of the second message, and the transmitting of the third message occur during IP multimedia subsystem (IMS) registration.

10. The method of claim 1, wherein the information included in the third message indicates not anchoring the call in the ATGW, if the second message indicates that the UE does not have the ability to perform the SRVCC procedures.

11. The method of claim 1, wherein the application server comprises a service centralization and continuity application server (SCC AS).

12. The method of claim 1, wherein the serving node is home subscriber server (HSS).

13. The method of claim 1, the method comprising:
    determining whether to anchor the call in a packet switched wireless network or a circuit switched wireless network based on an indication of an access network over which the call is originated or terminated.

14. An application server for establishing a call to or from a user equipment (UE) in a wireless communication system, the application server comprising:
    a transceiver configured to transmit and receive signals; and
    a controller configured to transmit a first message requesting a network capability of the UE to a serving node, to receive a second message including information regarding the network capability of the UE, and to transmit a third message including information regarding whether the UE has a capability of a single radio voice call continuity (SRVCC) to an access transfer control function (ATCF) based on the information regarding the network capability of the UE,
    wherein the information included in the third message is used for determining whether to anchor the call in an access transfer gateway (ATGW).

15. The application server of claim 14, wherein the wireless communication system comprises a first wireless network and a second wireless network, the second wireless network has an association with the first wireless network and the application server has an association with the first wireless network.

16. The application server of claim 14, wherein the serving node is a mobility management entity, if the serving node is in a packet switched wireless network.

17. The application server of claim 14, wherein the serving node is a serving GPRS support node (SGSN) or a mobile switching centre (MSC), if the serving node is in a circuit switched wireless network.

18. The application server of claim 14, wherein the information included in the third message indicates not anchoring the call in the ATGW, if the second message indicating that the UE does not have the ability to perform the SRVCC procedures.

19. The application server of claim 14, wherein the controller is further configured to transmit the first message and to receive the second message via a home subscriber server (HSS).

20. The application server of claim 19, wherein the first message is a Sh-pull message and the second message is a Sh-pull response message.

21. The application server of claim 14, wherein the application server comprises a service centralization and continuity application server (SCC AS).

22. The application sever of claim 14, wherein the transmission of the first message, the reception of the second message, and the transmitting the third message occur during IP multimedia subsystem (IMS) registration.

23. The application server of claim 15, wherein the first wireless network is capable of supporting packet switched voice communication and the second wireless network is capable of supporting circuit switched voice communication.

24. The application server of claim 14, wherein the second message relates to whether the UE has a single radio interface for communicating with a first wireless network and a second wireless network, such that only one radio connection with a wireless network can exist at any given point in time.

25. The application server of claim 14, wherein the second message relates to an ability of the UE to perform SRVCC procedures.

26. The application server of claim 25, wherein the information included in the third message indicates anchoring the call in the ATGW, if the second message indicates that the UE has the ability to perform SRVCC procedures.

27. The application server of claim 14, wherein the application server is a machine-type communications server and the requested network capability of the UE relates to UE transport capabilities.

28. The application server of claim 14, wherein the application server is a machine-type communications server and the requested network capability of the UE relates to the UE being a low priority device.

29. The application server of claim 14, wherein the requested network capability of the UE relates to I1 interface capability of the UE.

* * * * *